US012382206B2

(12) United States Patent
Ogishita et al.

(10) Patent No.: US 12,382,206 B2
(45) Date of Patent: Aug. 5, 2025

(54) HEADSET WITH RECIPROCATING MICROPHONE SUPPORT

(71) Applicant: Sony Interactive Entertainment LLC, San Mateo, CA (US)

(72) Inventors: Naoki Ogishita, San Mateo, CA (US); Sam Schaevitz, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 301 days.

(21) Appl. No.: 18/048,628

(22) Filed: Oct. 21, 2022

(65) Prior Publication Data

US 2024/0080598 A1 Mar. 7, 2024

Related U.S. Application Data

(60) Provisional application No. 63/374,898, filed on Sep. 7, 2022.

(51) Int. Cl.
*H04R 1/08* (2006.01)
*H04R 1/10* (2006.01)

(52) U.S. Cl.
CPC ............. *H04R 1/08* (2013.01); *H04R 1/1008* (2013.01); *H04R 1/105* (2013.01); *H04R 1/1066* (2013.01); *H04R 2201/107* (2013.01)

(58) Field of Classification Search
CPC ........ H04R 1/08; H04R 1/1008; H04R 1/105; H04R 1/1066; H04R 2201/107; H04R 1/1075; H04R 5/0335; H04R 1/083; H04R 1/1058; H04R 1/1033
See application file for complete search history.

(56) References Cited

U.S. PATENT DOCUMENTS 1,579,412 A 4/1926 Stenberg
4,302,635 A * 11/1981 Jacobsen .............. H04R 1/1058 381/378
D327,265 S 6/1992 Jasey
5,761,298 A 6/1998 Davis et al.
6,542,615 B1 4/2003 Ito
7,120,267 B2 10/2006 Ito et al.
8,213,667 B2 7/2012 Nelson et al.
9,036,849 B2 5/2015 Thompson et al.
9,813,799 B2 11/2017 Gecawicz et al.
9,838,776 B2 * 12/2017 Broadley ............. H04R 1/1066
9,838,778 B2 12/2017 Liu et al.
10,397,680 B2 8/2019 Alwicker et al.
2002/0131616 A1 * 9/2002 Bronnikov ............. H04R 1/083 381/376
2003/0210801 A1 11/2003 Naksen et al.
(Continued)

FOREIGN PATENT DOCUMENTS

CN 105721970 A * 6/2016 ........... H04R 1/1033

OTHER PUBLICATIONS

"International Search Report and Written Opinion", dated Mar. 4, 2024, from the counterpart PCT application PCT/US23/72254.
(Continued)

*Primary Examiner* — Angelica M McKinney
(74) *Attorney, Agent, or Firm* — Fish & Richardson P.C.

(57) ABSTRACT

A headset has a microphone boom slidably disposed in a sleeve of the headset with a microphone being mounted on the distal end of the boom. The boom is prevented from rotating in the sleeve.

29 Claims, 8 Drawing Sheets

(56) References Cited

U.S. PATENT DOCUMENTS

| | | | | |
|---|---|---|---|---|
| 2010/0040252 | A1* | 2/2010 | Thompson | H04R 1/083 381/375 |
| 2013/0121524 | A1* | 5/2013 | Liao | H04R 1/1075 381/375 |
| 2014/0010389 | A1* | 1/2014 | Slocum | H04R 1/1066 381/379 |
| 2016/0007112 | A1 | 1/2016 | Broadley et al. | |
| 2017/0257693 | A1 | 9/2017 | Breen et al. | |
| 2021/0377661 | A1 | 12/2021 | Kwun et al. | |
| 2022/0312094 | A1* | 9/2022 | Tang | H04R 1/08 |
| 2022/0329929 | A1* | 10/2022 | Zhao | H04R 1/1008 |
| 2024/0080607 | A1 | 3/2024 | Ogishita et al. | |

OTHER PUBLICATIONS

"No. 52 Type Head Telephone Set", Western Electric, T-2689A-1951.

* cited by examiner

HEADSET WITH RECIPROCATING MICROPHONE SUPPORT

FIELD

The present application relates generally to headsets with reciprocating microphone supports.

BACKGROUND

Certain computer simulations such as certain computer games (both virtual reality (VR) and non-VR) as well as audio entertainment entail the use of headsets with left and right ear cups having speakers for providing audio to the listener wearing the headset.

SUMMARY

An assembly includes at least one head band configured with a crown portion for being worn on a person's head, at least a first support structure defined by the head band, and at least one elongated boom slidably supported by the first support structure and including a distal end on which is mounted at least one microphone.

In example embodiments the boom cannot rotate within the first support structure. The boom may be slidably disposed within the first support structure, which may be unitarily made with the crown portion of the head band. The first support structure can be elongated and can be oriented generally perpendicular to the crown portion.

In non-limiting implementations structure can be provided that prevents withdrawing the boom completely out of the first support structure.

If desired, a first ear cup may be coupled to the first support structure to pivot about a first axis of the first ear cup and a second axis of the first ear cup, and at least a second ear cup can be coupled to a second support structure of the headband to pivot about a first axis of the second ear cup and a second axis of the second ear cup. The first axis of the first ear cup may pass through a center of the first ear cup from a first circumferential edge of the first ear cup to a second circumferential edge of the first cup that is diametrically opposite the first edge of the first ear cup. Similarly, the second axis of the first ear cup may pass through the center of the first ear cup from a third edge of the first ear cup to a fourth edge of the first cup that is diametrically opposite the third edge of the first ear cup. In other embodiments the first and second axes may not pass through the center of the ear cup but still are defined by respective lines from one circumferential edge to another circumferential edge. In example embodiments, the first ear cup cannot rotate about a third axis that is normal to the first and second axes of the first ear cup.

In another aspect, a headset includes a headband, an elongated microphone support, a microphone on the microphone support, and a sleeve defined by the headband in which the elongated microphone support is disposed for reciprocating motion relative to the sleeve.

In examples of this aspect, the microphone support is movable from an extended configuration, in which the microphone is distanced from the sleeve, and a retracted configuration, in which the microphone is closer to the sleeve than in the extended configuration. The elongated microphone support may include a gooseneck-like boom.

If desired, the microphone support can define a cross-sectional shape that is not completely round. Owing to the cross-sectional shape of the microphone support, at least one flat surface of the microphone support can ride against a surface of the sleeve to prevent rotation of the microphone support within the sleeve.

In another aspect, a method includes slidably disposing a microphone support on a headband, and coupling at least one microphone to the microphone support.

The details of the present application, both as to its structure and operation, can be best understood in reference to the accompanying drawings, in which like reference numerals refer to like parts, and in which:

DETAILED DESCRIPTION

Figure 1:
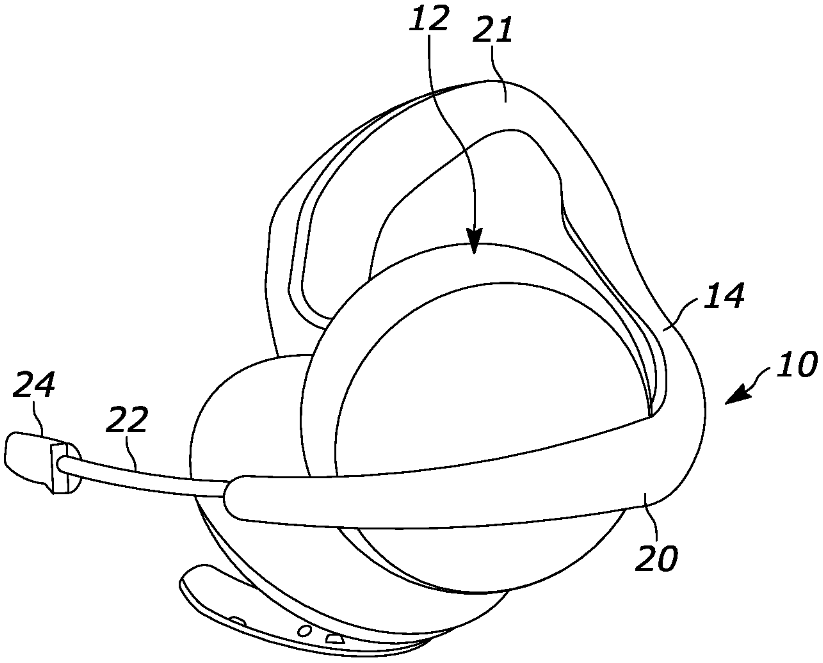
FIG. 1 illustrates an example headset with the microphone in the extended configuration, with portions of the head band broken away.

This disclosure relates generally to computer ecosystems including aspects of consumer electronics (CE) device networks such as but not limited to devices useful for computer game networks and audio systems. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 2:
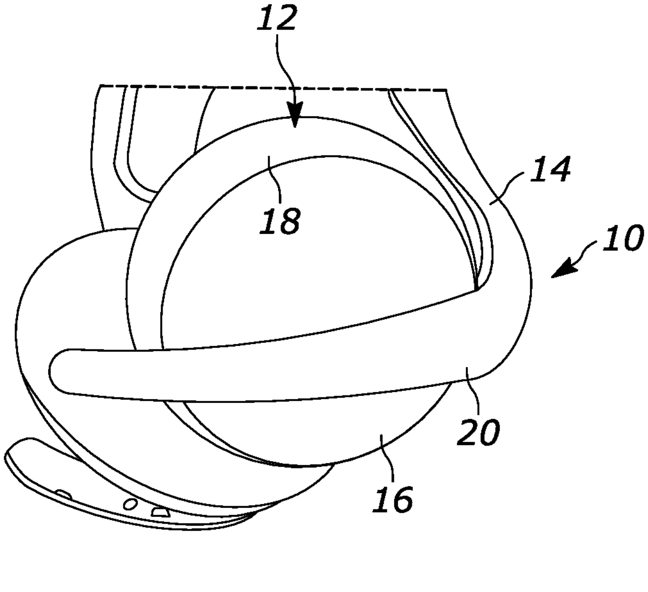
FIG. 2 illustrates the example headset of FIG. 1 with the microphone in the retracted configuration, with portions of the head band broken away.

Referring initially to FIGS. 1 and 2, a headset 10 includes left and right ear cups 12 mounted on a head band 14 configured to be worn over the crown of a person's head, with the ear cups 12 positioned over respective ears of the person. It is to be understood that each ear cup 12 may include a plastic shell 16 to which is adhered or otherwise joined a resilient ear pad 18, with a speaker (not shown) inside each ear cup 12 to produce sound.

In one embodiment, the head band 14 includes left and right generally horizontal support sections 20 that are elongated and generally perpendicular to the "crown" portion of the head band, at least one of which sections 20 may be hollow to form a sleeve. The head band 14 with support sections 20 may be a unitary monolithic structure with one of the support sections 20 functioning as a channel guide for an elongated flexible gooseneck-like microphone boom 22. A microphone 24 is on a distal end of the boom 22, and structure 26 (FIGS. 4 and 5) such as a crimped or enlarged proximal end within the support section 20 to prevent the boom 22 from being extracted completely out of the support section.

In FIG. 1, the microphone 24 has been pulled away from the support section 20 to an extended configuration, in which the microphone 24 is located close to the mouth of the wearer to receive voice signals from the wearer. In FIG. 2, the boom 22 has been slide back into the support section 20 so that the microphone 24 is retracted away from the mouth. In one embodiment, in the retracted configuration, the microphone 24 is located outside the support structure, abutting a distal end of the support structure 20. In another embodiment, the microphone 24 in the retracted configuration is located partially within and partially without the support structure 20. In another embodiment, the microphone 24 in the retracted configuration is located entirely within the support structure 20.

Figure 3:
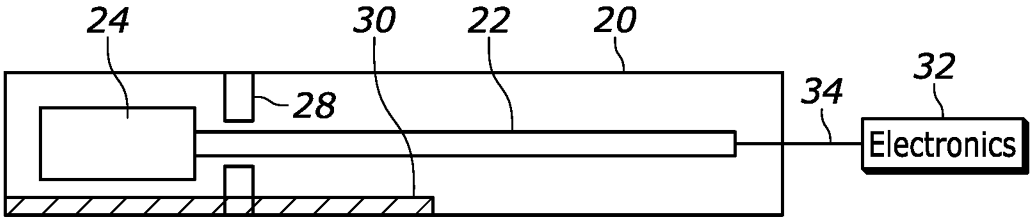
FIG. 3 illustrates a side view of the microphone in the retracted configuration, with the anti-rotation rib not shown.
Figure 4:
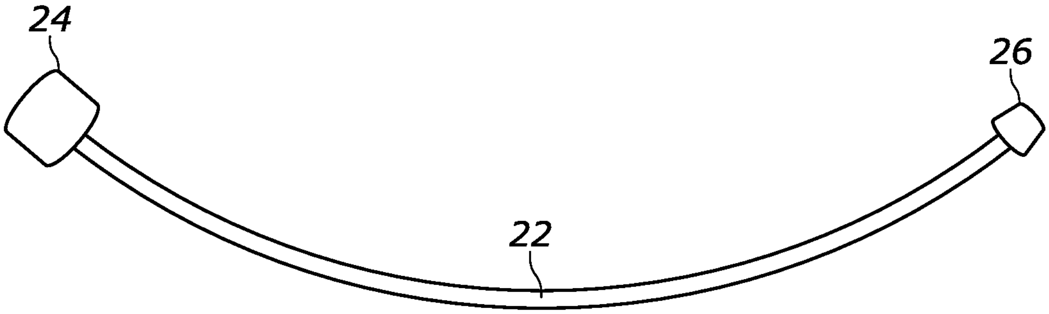
FIG. 4 illustrates a side view of the microphone with gooseneck-like boom in a curved configuration as it would assume inside the sleeve.
Figure 5:
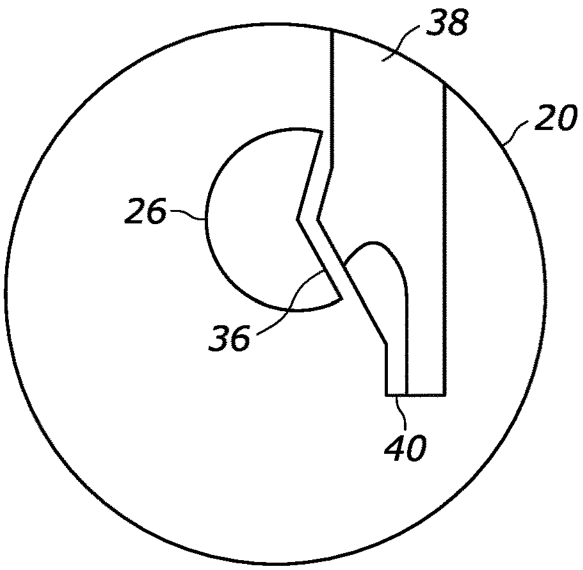
FIG. 5 illustrates a transverse view of the proximal end of the boom showing that at last part of the boom is not completely round, showing a flattened crimped portion mating slidably with the anti-rotation rib.
Figure 5A:
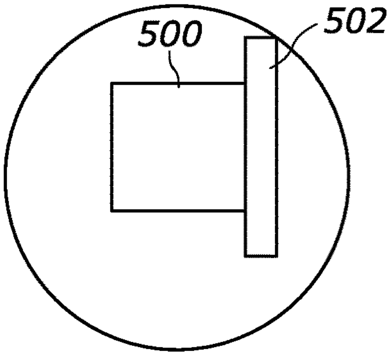
FIGS. 5A and 5B illustrate alternate examples of booms that have at least a partially flat transverse cross-section to mate with an anti-rotation rib.

Turn now to FIGS. 3-5 for further understanding. As shown in FIG. 3, a stop 28 may be formed in the support structure 20 to limit proximal motion of the microphone 24 past the stop 28, with the boom 22 passing through the stop 28 and slidable back and forth in the stop. When the headband 14 is made of plastic, a thin metal support strip 30 may be provided in the support structure 20 to give strength to the support structure 20. Appropriate electronics 32 may be connected to the microphone 24 through the boom 22 by one or more electrical conductors 34 to pick up and process signals from the microphone 24 as input to, e.g., a computer game console or other electronics device.

FIG. 4 illustrates that the flexible boom 22 may be curved in the longitudinal dimension either by material bias or by reason of confinement within a curved channel in the support structure 20.

In some embodiments the boom 22 is constrained from rotating within the support structure 20. This may be achieved by making part or all of the boom 22 not completely round and providing an anti-rotation structure within the support structure 20 that mates with the boom to prevent it from rotating while sliding in and out. In the example shown in FIG. 5, only the proximal end of the boom 22 is not completely round. With more particularity, in the example of FIG. 5, the proximal end 26 of the boom 22 has been crimped to form a flat surface 36 in transverse cross-section, with an anti-rotation rib 38 being formed in the support structure 20 and having a flat surface 40 slidably mating with the flat surface 36 of the boom 22. The portion of the boom other than the flat surface 36 may be partially, but not completely, round. The flat surface 36 of the boom 22 may be on the proximal end only or it may extend along part or all of the boom 22 along the length of the boom 22, with the rib 38 extending along part or all of the length of the slidable travel of the boom 22. As mentioned above, the crimped proximal end 26 of the boom 22 may be larger than the opening in the stop 28 shown in FIG. 3 to prevent the boom 22 with microphone 24 from being completely slid out of the headband. Or, if desired the boom 22 may be configured to allow the boom with microphone to be pulled completely out of the headband.

Figure 5B:
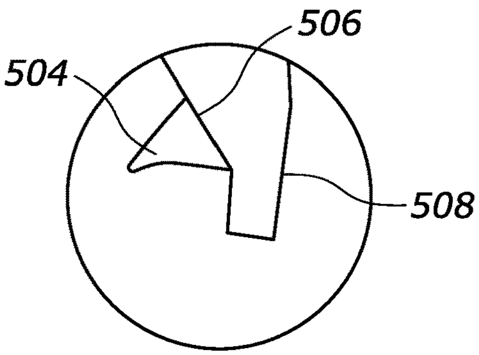

Other non-limiting example shapes of the boom 22 may be ovular, or rectangular (as indicated at 500 in FIG. 5, sliding against a flat rib 502), or triangular as indicated at 504 in FIG. 5B, sliding against a flat, sloped surface 506 of a rib 508.

Figure 6:
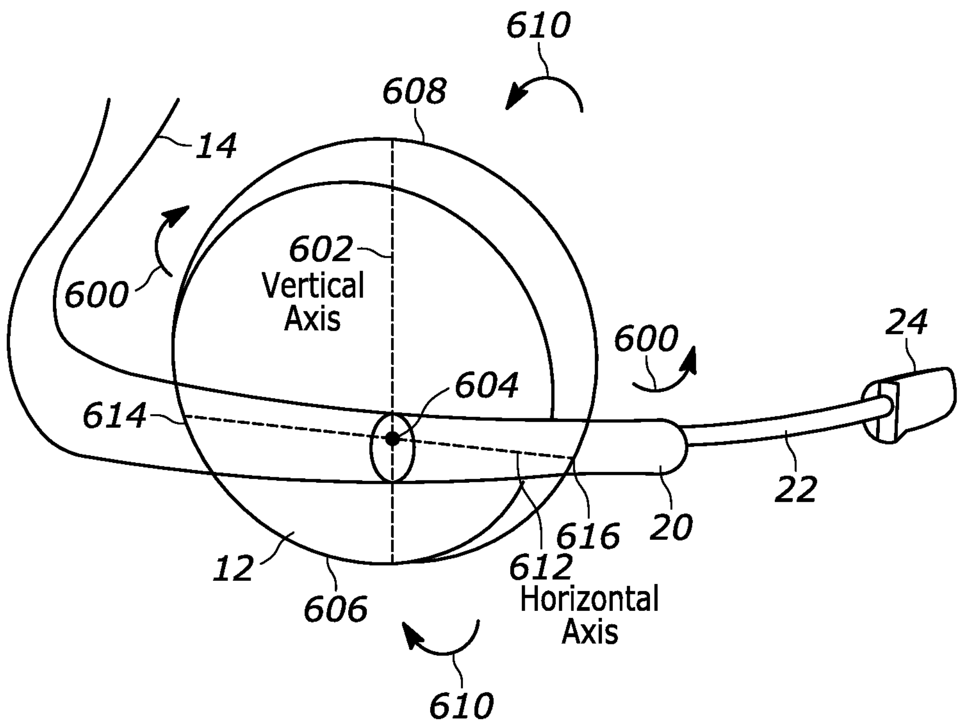
FIG. 6 illustrates a side view of an ear cup of the headset illustrating permitted pivotal motion of the ear cup with respect to the ear cup arm.

Refer now to FIG. 6, illustrating additional inventive features. The ear cup 14 shown in FIGS. 1 and 2 can pivot back and forth about each of first and second axes relative to the support structure 20. More specifically, as indicated by the arrows 600, the ear cup 14 can pivot about a first axis 602 back and forth. In the example shown, the first axis 602 extends through the center 604 of the ear cup from a first circumferential edge 606 of the ear cup 14 to a second circumferential edge 608 of the ear cup 14 that is diametrically opposite the first edge 606. In the specific embodiment shown, the orientation of the first axis 602 is vertical or substantially vertical.

Similarly, as indicated by the arrows 610, the ear cup 14 can pivot about a second axis 612 back and forth. In the example shown, the second axis 612 extends through the center 604 of the ear cup from a third circumferential edge 614 of the ear cup 14 to a fourth circumferential edge 616 of the ear cup 14 that is diametrically opposite the third edge 614. In the specific embodiment shown, the orientation of the second axis 612 is horizontal or substantially horizontal.

Figure 7:
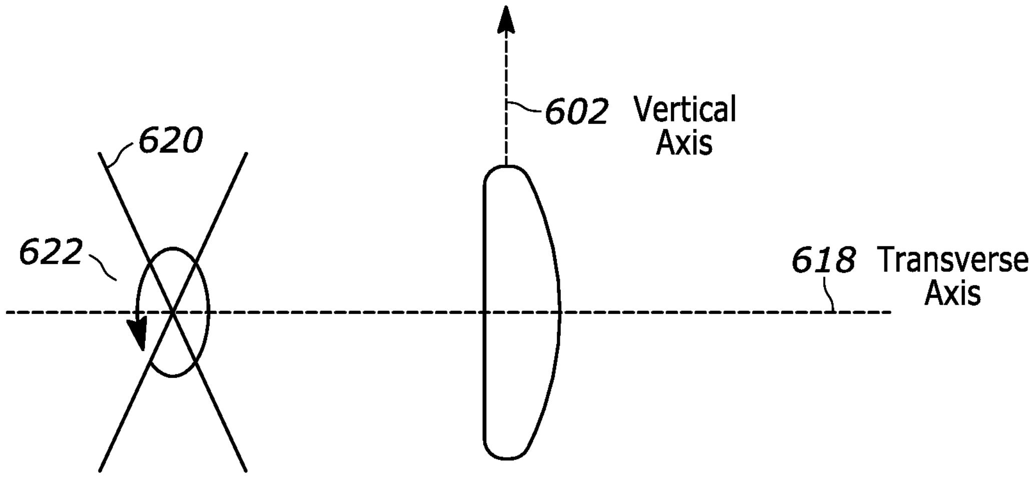
FIG. 7 schematically illustrates a view of the ear cup orthogonal to that of FIG. 6 to illustrate non-permitted rotation.
Figure 8:
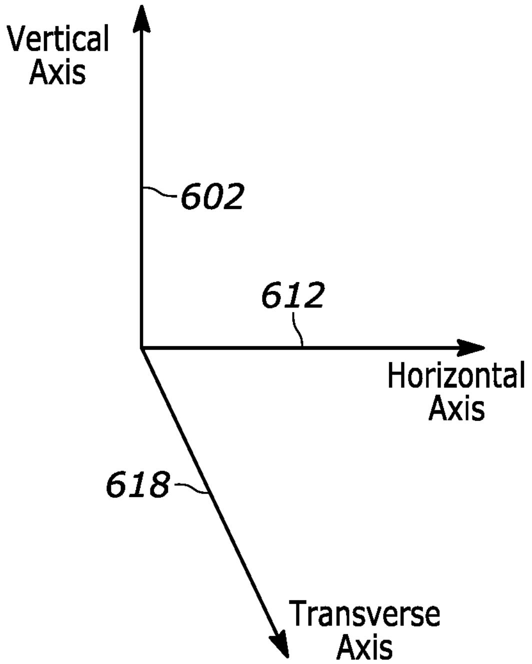
FIG. 8 schematically shows the dimensions of the three axes discussed in relation to FIGS. 6 and 7.

On the other hand, as to the transverse axis 618 shown in FIGS. 7 and 8 that passes through the center 604 of the ear cup 14 perpendicular to the circumference of the ear cup 14, rotation of the ear cup 14 about the transverse axis 618 may be completely or substantially prevented, as indicated by the "X" 620 over the rotation arrow 622 in FIG. 7.

The axes 602, 612, and 618 can be normal to each other.

Figure 9:
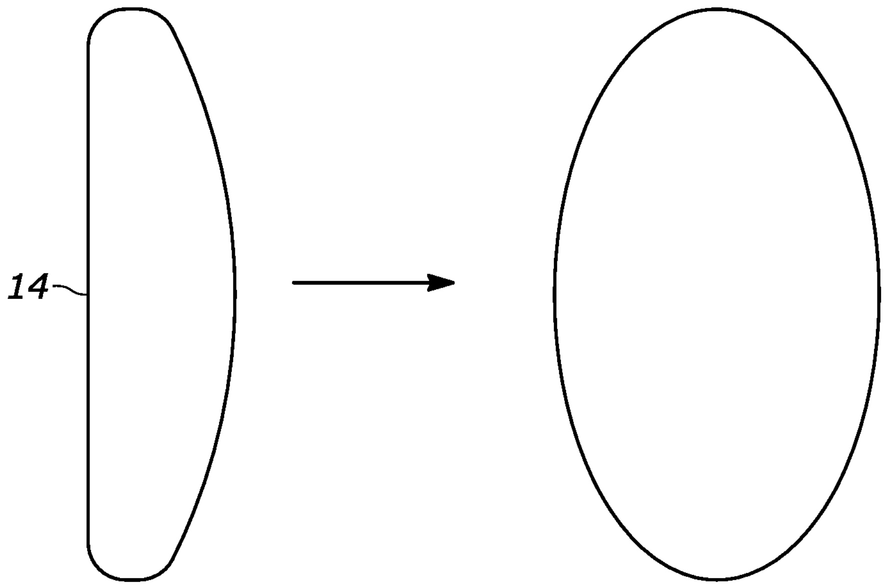
FIG. 9 schematically illustrates rotation of an ear cup about a first edge-to-edge axis, in this example, a vertical axis.
Figure 10:
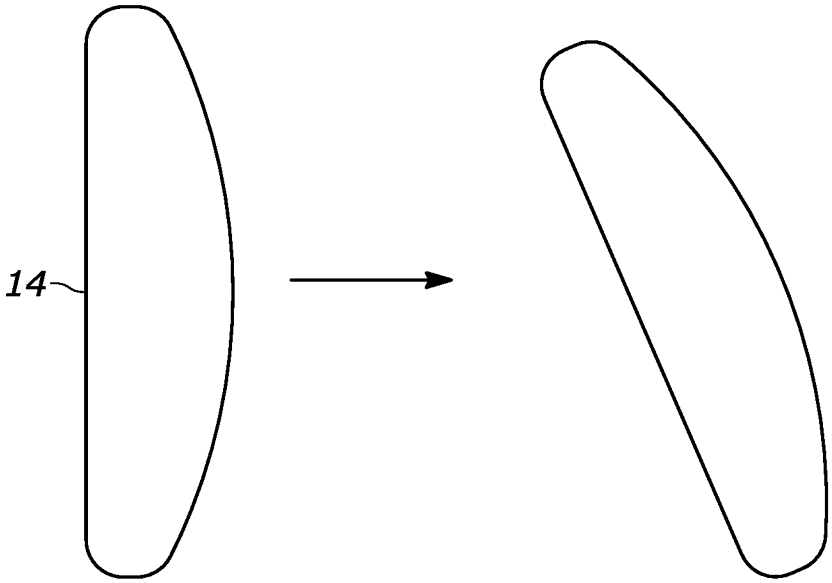
FIG. 10 schematically illustrates rotation of an ear cup about a second edge-to-edge axis, in this example, a horizontal axis.

FIGS. 9 and 10 illustrate further. In FIG. 9, the ear cup 14 is shown on the left from behind the wearer in a baseline orientation, while on the right the ear cup 14 is shown having been pivoted about the vertical axis. In FIG. 10, the ear cup 14 is shown on the left from behind the wearer in a baseline orientation, while on the right the ear cup 14 is shown having been pivoted about the horizontal axis.

FIGS. 11-14 illustrate an example hinge 1100 that movably couples the ear cup 14 to the support structure 20 consistent with disclosure above. Back-and-forth pivoting motion of the ear cup 14 relative to the support structure 20 about the first axis 602 is afforded by a first disc-shaped pivot plate 1102 through the ball discussed below while back-and-forth pivoting motion of the ear cup 14 relative to the support structure 20 about the second axis 612 is afforded by a racetrack-shaped pivot plate 1104 that faces and lies against the first disc-shaped pivot plate 1102.

Figure 11:
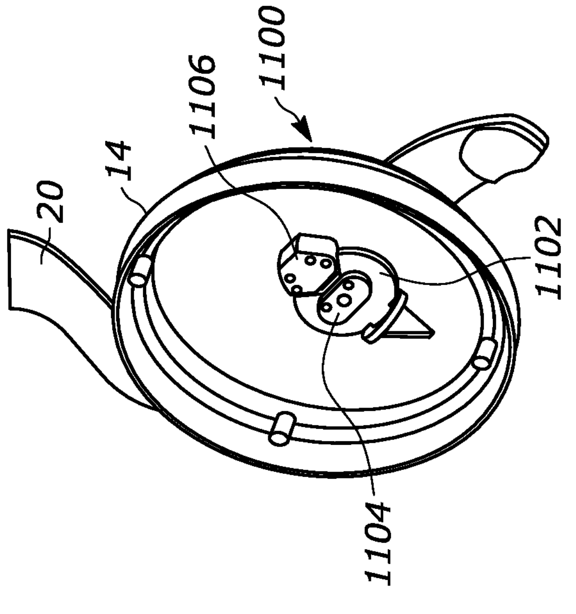
FIGS. 11-14 illustrate cut-away views of an ear cup shell and headband support arm illustrating an example joint consistent with present principles.
Figure 12:
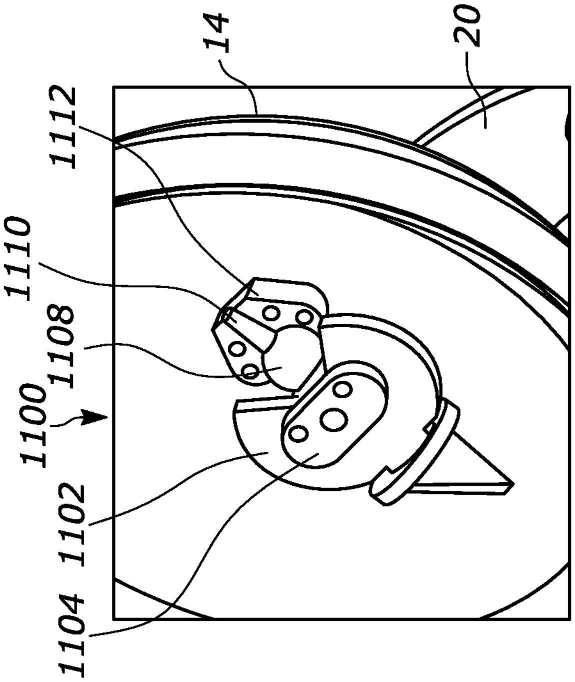

A wedge-shaped anti-rotation mechanism 1106 fits into a complementary wedge-shaped opening of the first disc-shaped pivot plate 1102 as shown in FIG. 11. The outer cover of the anti-rotation mechanism 1106 is removed in FIG. 12 to reveal a ball 1108 from which extends a short axle 1110 that fits in a grooved boss 1112 formed on the interior of the ear cup 14 to prevent rotation of the ear cup 14 about the transverse axis 618. However, to permit rotation in the other dimension described above, a perpendicular groove 1114 (FIG. 14) is formed in the boss 1112 perpendicular to the groove the axle is disposed in so that the end of the axle can pivot in the groove 1114.

Figure 13:
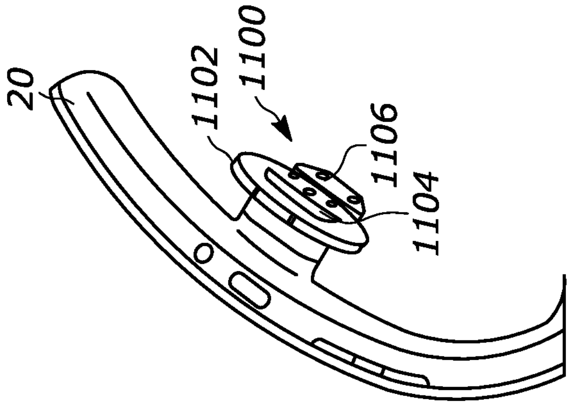
Figure 14:
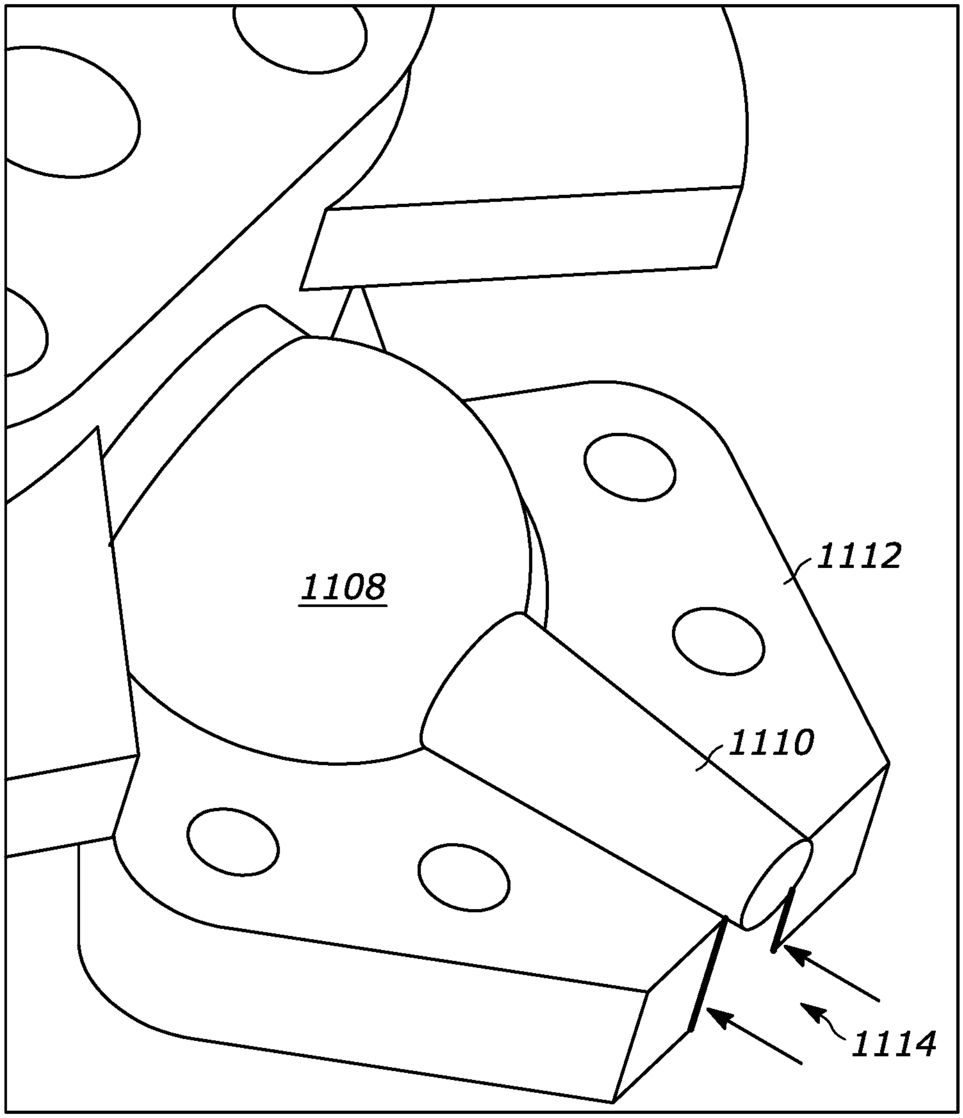

The ear cup 14 is removed in FIG. 13 to illustrate the example hinge 1100 being joined to the support structure 20.

While the particular embodiments are herein shown and described in detail, it is to be understood that the subject matter which is encompassed by the present invention is limited only by the claims.

What is claimed is:

1. An assembly, comprising:

at least one headband;

at least a first support structure defined by the headband;

at least one elongated boom slidably supported by the first support structure and comprising a distal end on which is mounted at least one microphone;

a first ear cup coupled to the first support structure to pivot about a first axis of the first ear cup and a second axis of the first ear cup;

at least a second support structure defined by the head band; and at least a second ear cup coupled to the second support structure to pivot about a first axis of the second ear cup and a second axis of the second ear cup, wherein the first axis of the first ear cup passes through a center of the first ear cup from a first circumferential edge of the first ear cup to a second circumferential edge of the first cup that is diametrically opposite the first edge of the first ear cup, the second axis of the first ear cup passes through the center of the first ear cup from a third edge of the first ear cup to a fourth edge of the first cup that is diametrically opposite the third edge of the first ear cup, and the first ear cup cannot rotate about a third axis that is normal to the first and second axes of the first ear cup.

2. The assembly of claim 1, wherein the boom cannot rotate within the first support structure.

3. The assembly of claim 1, wherein the boom is slidably disposed within the first support structure.

4. The assembly of claim 1, wherein the first support structure is unitarily made with the crown portion of the head band.

5. The assembly of claim 1, wherein the first support structure is elongated and is oriented generally perpendicular to the crown portion.

6. The assembly of claim 1, comprising structure that prevents withdrawing the boom completely out of the first support structure.

7. The assembly of claim 1, wherein the first support structure comprises a hollow portion forming a sleeve for accommodating the boom.

8. The assembly of claim 1, wherein the boom comprises a crimped or enlarged proximal end within the first support structure preventing removal of the boom from the first support structure.

9. The assembly of claim 1, wherein the at least one microphone is located outside of the first support structure.

10. The assembly of claim 1, wherein the first support structure comprises a stop preventing motion of the at least one microphone into the first support structure.

11. The assembly of claim 1, wherein the first support structure comprises an anti-rotation rib configured to receive a portion of the boom.

12. The assembly of claim 1, wherein the first ear cup is coupled to the first support structure by a hinge comprising a ball and a pair of pivot plates.

13. The assembly of claim 12, wherein the pair of pivot plates comprises a disc-shaped pivot plate allowing back-and-forth motion of the first ear cup about the first axis.

14. The assembly of claim 13, wherein the pair of pivot plates comprises a racetrack-shaped pivot plate lying against the disc-shaped pivot plate.

15. The assembly of claim 12, wherein the hinge comprises a wedge-shaped anti-rotation mechanism that fits into a complementary opening in a first of the pair of pivot plates.

16. The assembly of claim 1, wherein the headband comprising a first support structure defining the sleeve.

17. The assembly of claim 16, wherein the first ear cup is coupled to the headband by a hinge located at the first support structure.

18. The assembly of claim 16, wherein the at least one microphone is located outside of the first support structure.

19. The assembly of claim 16, wherein the first support structure comprises a stop preventing motion of the at least one microphone into the first support structure.

20. The assembly of claim 16, wherein the first support structure comprises an anti-rotation rib configured to receive a portion of the boom.

21. The assembly of claim 16, wherein the hinge comprises a ball and a pair of pivot plates.

22. The assembly of claim 21, wherein the pair of pivot plates comprises a disc-shaped pivot plate allowing back-and-forth motion of the first ear cup about the first axis.

23. The assembly of claim 22, wherein the pair of pivot plates comprises a racetrack-shaped pivot plate lying against the disc-shaped pivot plate.

24. The assembly of claim 21, wherein the hinge comprises a wedge-shaped anti-rotation mechanism that fits into a complementary opening in a first of the pair of pivot plates.

25. A headset comprising:

a headband;

an elongated microphone support;

a microphone on the microphone support;

a sleeve defined by the headband in which the elongated microphone support is disposed for reciprocating motion relative to the sleeve; and at least a left ear cup coupled to the headband to pivot about both a first and a second axis extending diametrically across the left ear cup, wherein the left ear cup cannot rotate about a third axis that is perpendicular to the first and second axes.

26. The headset of claim 25, wherein the microphone support is movable from an extended configuration, in which the microphone is distanced from the sleeve, and a retracted configuration, in which the microphone is closer to the sleeve than in the extended configuration.

27. The headset of claim 25, wherein the elongated microphone support comprises a gooseneck boom.

28. The headset of claim 25, wherein the microphone support defines a cross-sectional shape that is not completely round.

29. The headset of claim 28, wherein owing to the cross-sectional shape of the microphone support, at least one flat surface of the microphone support rides against a surface of the sleeve to prevent rotation of the microphone support within the sleeve.

* * * * *